(12) United States Patent
Van der Spiegel

(10) Patent No.: US 11,315,153 B1
(45) Date of Patent: Apr. 26, 2022

(54) SYSTEM AND METHOD FOR REAL-TIME PRICE DETERMINATION IN COMPUTERIZED MARKETPLACE AND E-COMMERCE PLATFORMS

(71) Applicant: Karl Albert Van der Spiegel, Vlaams Brabant (BE)

(72) Inventor: Karl Albert Van der Spiegel, Meise (BE)

(*) Notice: Subject to any disclaimer, the term of this patent is extended or adjusted under 35 U.S.C. 154(b) by 0 days.

(21) Appl. No.: 17/327,679

(22) Filed: May 22, 2021

(51) Int. Cl.
*G06Q 30/02* (2012.01)
*G06Q 30/06* (2012.01)
*G06F 3/0482* (2013.01)

(52) U.S. Cl.
CPC ..... *G06Q 30/0283* (2013.01); *G06Q 30/0641* (2013.01); *G06F 3/0482* (2013.01)

(58) Field of Classification Search
CPC ........... G06Q 30/0641; G06Q 30/0283; G06Q 30/0275; G06Q 30/08; G06Q 40/04; G06Q 50/00; G06F 3/0482; H04L 41/30; H04L 2209/466
USPC .............................. 705/7.35, 14.71, 26.3, 37
See application file for complete search history.

(56) References Cited

U.S. PATENT DOCUMENTS

| | | | | |
|---|---|---|---|---|
| 7,617,145 B1* | 11/2009 | Peterson | ................ | G06Q 30/08 705/35 |
| 10,453,119 B2 | 10/2019 | Yenisetty et al. | | |
| 10,769,719 B1 | 10/2020 | Windsor et al. | | |
| 2009/0112733 A1* | 4/2009 | Horowitz | ............... | G06Q 30/08 705/26.1 |
| 2015/0120614 A1* | 4/2015 | Westphal | ........... | G06Q 30/0283 705/400 |
| 2015/0332388 A1* | 11/2015 | Ziegenfus | .............. | G06Q 30/08 705/26.3 |
| 2019/0347713 A1* | 11/2019 | Cohen | .................... | G06Q 30/08 |
| 2020/0311758 A1 | 10/2020 | Brosnan et al. | | |

FOREIGN PATENT DOCUMENTS

WO   WO-0065505 A2 *  11/2000   ............. G06Q 30/06

OTHER PUBLICATIONS

"Workarounds for eBay Auctions With Reserve Not Met," by Aron Hsiao, Jun. 25, 2019 (Year: 2019).*
"How to Price Your Product: A Guide to the Van Westendorp Pricing Model" Rebecca Sadwick. Forbes.com Jun. 22, 2020.

* cited by examiner

*Primary Examiner* — George Chen
*Assistant Examiner* — Brian Adams Heflin
(74) *Attorney, Agent, or Firm* — Howard IP Law Group, P.C.

(57) ABSTRACT

A computerized system is provided for processing data in connection with systems for offering and sale of goods and services. In the computerized system, a server system provides for a seller device to provide item identification information and a minimum price. The server system makes the item identification information, and not the minimum price, available to one or more buyer user devices. Responsive to an indication of interest, the system provides the buyer user device with a series of sets of ranges of prices for selection, followed by a set of prices for selection. If the user selects a price from the set of prices above the minimum price, the difference between the minimum price and the selected price is allocated among buyer, seller, and server system, and a transaction proceeds.

22 Claims, 9 Drawing Sheets

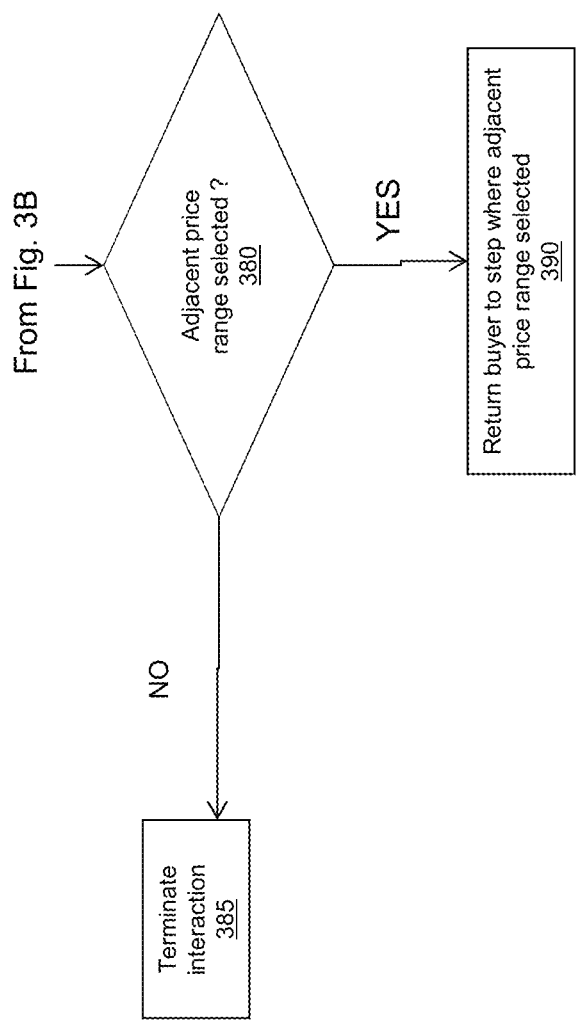

SYSTEM AND METHOD FOR REAL-TIME PRICE DETERMINATION IN COMPUTERIZED MARKETPLACE AND E-COMMERCE PLATFORMS

CROSS-REFERENCES TO RELATED APPLICATIONS

None

FIELD OF THE INVENTION

The present disclosure is in the field of computerized electronic commerce, and particularly in the field of platforms and other electronic resources to facilitate the matching of prospective purchasers and prospective sellers through the real-time determination of prices.

BACKGROUND

The field of computerized online marketplaces for the offering, bidding and purchase of goods and services is technologically complex. One of the challenges in this field is the determination of prices by sellers and buyers. Computerized online marketplaces facilitate the sale of items by individuals who are not always familiar with products and services and particular prices.

Purchasers may also be uncertain as to appropriate suitable offers in online marketplaces. Purchasers may be unfamiliar with the value of goods and services that the purchasers acquire infrequently. Such purchasers may be consumers purchasing products and services. Products may be nonstandard, such as used or repaired products, providing uncertainty as to valuation. Businesses and other professionals making purchases may be unfamiliar with pricing for particular products and services for business use, such as products and services that are not purchased routinely in the conduct of a business. Moreover, businesses, government and non-profit organizations, may purchase uncommon or customized products and services, for which comparable products and services cannot readily be determined. Even professional sellers and buyers are making greater use of online platforms and thus are often confronted with unforeseen and unpredictable price dynamics compared to traditional marketplaces.

Various solutions have been proposed to provide guidance to buyers and sellers as to proper pricing of particular products and services. For example, some platforms may provide information as to prior sales of similar goods and services, such as historical item listings, and bid velocity information, among other types of such prior sale information.

New and more technically efficient, real-time, cost effective solutions to assist in determining prices, from both the perspective of the seller and the perspective of the buyer, thereby making technological transaction platforms even more accessible, are desired.

SUMMARY

In some embodiments, a system is provided for processing data in connection with computerized transactions for the purchase and sale of products and services to reach a guided price agreement in real time. The system includes one or more server computer systems, the one or more server computer systems having one or more computer processors and one or more memories in communication with the one or more computer processors. The one or more memories store computer readable program code. When the one or more computer processors execute the computer readable program code, the one or more server computer systems perform a series of steps. Via one or more networks, communication is established between the server computer system and a plurality of user devices. The server computer system receives from a user device an identification of an item for sale and a minimum price for the item. Responsive to the receiving, the system makes the identification of the item and not the minimum price available for access by one or more buyer user devices. Responsive to an indication of interest from one of the buyer user devices, the system presents on an interface of the buyer user device a first plurality of price ranges or price intervals for selection. In the present disclosure, a price range or price interval comprises intermediate price values between a minimum value and a maximum value. Responsive to receipt of a selection of one of the first plurality of price ranges, the system presents on an interface of the buyer user device a second plurality of price ranges for selection, each of the second plurality of price ranges being within the selected one of the first plurality of price ranges. Responsive to receipt of a selection of one of the second plurality of price ranges, the system presents on an interface of the buyer user device a third plurality of price ranges for selection, the third plurality of price ranges being within the selected one of the second plurality of price ranges. In embodiments, the process of presenting further plurality of price ranges for selection may continue for additional iterations. Responsive to receipt of a selection of one of the price ranges in a final one of the iterations, the system presents on an interface of a buyer user device a plurality of particular prices for selection, each price being within the final price range. Responsive to receipt of one of the plurality of particular prices that is higher than the minimum price, the system determines an allocation of the difference between the bid or offer price and the minimum price to set a price to be paid by the buyer, a price to be received by the seller, and an amount to be received by a platform for facilitating the transaction. The reduced interval pricing model system of the present disclosure provides to the seller device an indication of the price to be received by the seller and to the buyer device an indication of the price to be paid by the buyer. The system may then provide instructions to one or more payment systems to cause payments to be made by the buyer, and payments to be made to the seller and to the platform. Additional embodiments are disclosed herein.

In an embodiment, there is disclosed a method comprising receiving in a computer processor an electronic identifier of an item for sale and a minimum price for the item from a user device, via a network interface of a computer network. Responsive to the receiving step, the method further comprises the computer processor making accessible the identification of the item, and making inaccessible the minimum price, by one or more buyer user devices connected to the computer network. Responsive to an electronic indication of interest from one of the buyer user devices received in the computer processor, the method comprises presenting on an interface of the buyer user device a first plurality of price ranges for selection; and responsive to receipt of selection of a given one of the first plurality of price ranges, presenting on an interface of the buyer user device a second plurality of price ranges for selection, wherein each of the second plurality of price ranges are contained within the selected one of the first plurality of price ranges. In embodiments, the process of presenting further plurality of price ranges for selection may continue for additional iterations. The method further includes presenting on an interface of the buyer user device a plurality of particular prices for selection in response to receipt of selection of a given one of the final plurality of price ranges. The method further includes, responsive to receipt of one of the plurality of particular (individual) prices that is higher than the minimum price, allocating a difference between the received selected price and the minimum price among seller, buyer and platform; and providing to the seller device via the network an indication of the price to be received, and to the buyer device an indication of the price to be paid.

In an embodiment, there is disclosed a non-transient computer readable medium storing instructions that when executed by a processor cause the processor to: responsive to receipt of an electronic identifier of an item for sale and a minimum price for the item from a user device, via a network interface, make the identification of the item accessible by one or more buyer user devices, and make inaccessible the minimum price by one or more buyer user devices connected to the computer network; generate a first plurality of price ranges associated with the item for sale for presentation and selection on an interface of the buyer user device, responsive to receipt of an electronic indication of interest from one of the buyer user devices; generate, in response to receipt of selection of a given one of the first plurality of price ranges, a second plurality of price ranges for selection, wherein each of the generated second plurality of price ranges is within the selected one of the first plurality of price ranges, and wherein the second plurality of price ranges are presented for selection on an interface of the buyer user device. In embodiments, the process of presenting further plurality of price ranges for selection may continue for additional iterations. The instructions further cause the processor to generate a plurality of individual prices for presentation and selection on an interface of the buyer user device, responsive to receipt of selection of a given one of the final plurality of price ranges; and responsive to receipt of one of the plurality of individual prices that is higher than the minimum price: a) allocate a difference between the received selected price and the minimum price among seller, buyer and platform; and b) provide to the seller device via the network an indication of the price to be received, and to the buyer device an indication of the price to be paid.

BRIEF DESCRIPTION OF THE DRAWINGS

A more detailed understanding may be had from the following description, given by way of example in conjunction with the accompanying drawings wherein:

FIGS. 3A, 3B and 3C show an exemplary process flow of an embodiment of the present invention.

DETAILED DESCRIPTION

Figure 1:
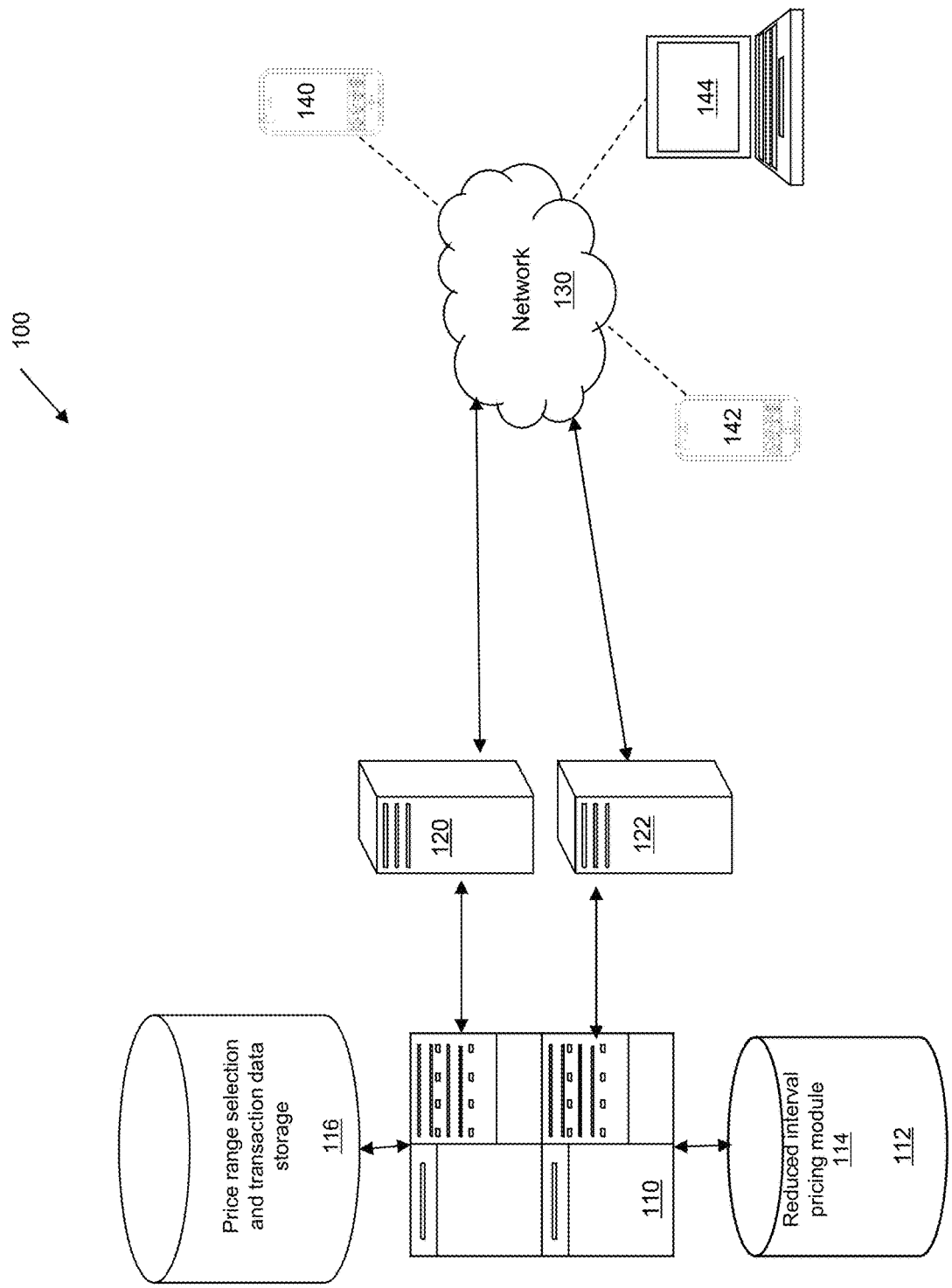
FIG. 1 shows an exemplary computer architecture that may be used for data management in electronic marketplace and e-commerce transactions.

Disclosed herein are processor-executable methods, computing systems, and related technologies providing improvements in connection with computerized systems for facilitating transactions, including systems for permitting users to offer products and services for sale, for permitting users to review products and services offered for sale, and for prospective purchasers to determine prices to be paid for products and services. Thus, the disclosed methods, computer systems and related technologies are in the field of electronic marketplaces and e-commerce platforms for goods and services, and in particular for determining real-time pricing in such electronic marketplaces and e-commerce platforms. Existing systems and methods provide a variety of approaches to providing assistance for such electronic marketplaces. In some existing systems, a prospective seller may determine a price and publish the price along with information about the product or service. Such existing systems are configured for, responsive to an indication from a buyer of a purchase at the desired price, to close off opportunities for other prospective purchasers to seek to purchase the product or service.

Other existing systems are configured for various types of auction formats, in which prospective purchasers indicate a bid price during a period of time. On closing of the time period that the seller has set, prospective buyers are no longer able to submit bids. In general, the highest bidder, so long as the reserve price has been met, then is to take the necessary steps to close the transaction, or the transaction is automatically closed, if, for example, the marketplace platform already has the successful bidder's payment information. In an embodiment, by closing the transaction, it is meant that the buyer's payment is received by the marketplace platform. By way of example, this may occur via the marketplace platform initiating a payment transaction by submitting stored information as to the buyer's payment card to a payment card processing network (e.g., the MasterCard® or Visa® payment card processing networks), and the marketplace platform receiving approval of the payment from the payment card processing network. The transaction may also be closed by successful receipt by the marketplace platform of the buyer's payment via another process, such as via an electronic payment system (e.g., the PayPal®, Apple Pay® payment networks). In an embodiment, the transaction may be deemed closed immediately upon receipt of a particular bid or offer greater than the minimum price, if the platform has stored payment details, such as payment card or banking information, of the successful bidder. By way of example, the system may provide a process by which a user becomes registered by providing certain information, such as name, address, other contact information, and payment information, prior to commencement of a process of the present invention.

Such electronic marketplaces are configured to take steps to close a transaction and restrict further prospective purchasers from submitting either acceptance of an offer at a particular price or bids once a prospective purchaser has selected a price, either a purchase price or a bid price.

A challenge of such prior art electronic marketplaces is that the prospective purchaser must choose a particular price, either for an acceptance or for a bid. The price determination may be difficult for a variety of reasons. For example, the goods or services may be unique, such as used products, or services of an unusual nature. By way of further example, the prospective purchaser may not be familiar with prices for such items. While advice may be provided by a platform, such as by providing information on prices of comparable goods and services, prospective purchasers may be deterred from making offers as a result of lack of guidance. Thus, electronic marketplaces have a technological deficiency that has been unsuccessfully addressed. That is, prior technological systems that perform computerized functions in an ordered combination of operations which deter users from accessing and/or operating such computerized systems by virtue of their particular processing operations, diminishes the numbers of those partaking in online or electronic marketplaces, which in turn, diminishes the effectivity, efficiency, and viability of prior art technological solutions to address real-world problems in real-time fashion. In contrast, the ordered combination of computer performed functions, computer components, and user interactions with those ordered combinations as recited in the present disclosure, transform the technological system and technical process steps implemented herein into one that technologically facilitates user interaction via an iterative, ranging methodology, with multiple different ranging operations dependent on user input, as well as ordered combinations of operations and temporal interactive feedback processing from additional users potentially vying for the same product. In contrast to prior art marketplace platforms and e-commerce systems, in which the system may accept user input indicative of a bid or user input indicative of acceptance of an offered price immediately, without presentation of intermediate screens or performing intermediate steps. In embodiments of the present disclosure, the system is configured to interpose between an indication of interest of a potential buyer and the presentation of a bid or offer additional technological steps, including determinations of sets of price ranges, presentation on a user interface of sets of price ranges, and receipt from remote user interfaces of user selection of price ranges from among set of price ranges, none of which are conventional in connection with e-commerce and marketplace platforms of the prior art. The use of computerized processing is necessary to obtain real-time implementation of techniques disclosed herein, such as the real-time determinations of price ranges for selection, where values of the price ranges are based in part on random factors. The present disclosure thus provides for a technological system and implementation of ordered combinations of elements and process steps that result in a more robust, efficient, real-time system, and one that does not require a prospective purchaser to determine a price of acceptance, or a bid price before entering into a process of interaction with the platform.

Embodiments disclosed herein provide for a process that does not require a prospective purchaser to determine a price of acceptance or a bid price before entering into a process of interaction with the platform. The present reduced interval pricing model system and method provides for an interaction between the platform and the prospective purchaser to permit the prospective purchaser to determine, via an interactive process, an offer price. During this interaction, the platform provides via a user interface of a user device a series of sets of ranges of prices for selection. Each subsequent set of price ranges in the series of sets of price ranges is within the prior selected price range. Responsive to selection of a price range in a final set of price ranges, a set of particular prices is displayed for selection. Responsive to selection of one of the particular prices, if the selected price is below the minimum price, then the transaction does not proceed. In embodiments, the user may be provided a second opportunity to select ranges from sets of ranges to determine if a price above the minimum will be selected. If the selected offer or bid purchase price is above the minimum price, then the transaction proceeds. The price paid by the buyer, the amount paid to the seller, and the amount paid to the platform may be determined by dividing or allocating the surplus, i.e., the difference between the selected offer price and the minimum price, among the buyer, the seller and the platform. The system thus determines the purchase price, or the price paid, and the sale price, or the price received, in real-time.

The use or implementation of a selection of price ranges without disclosure of the minimum price thus leads to determination of a price acceptable to the buyer. The use or implementation of a series of interfaces displaying narrowing price ranges guides the buyer to the determination of a value which the buyer places on the item. The difference between the price acceptable to the buyer and the minimum price, when divided among the buyer, the seller and the platform, results in the buyer paying a purchase price which is lower than the selected offer price, and thus enjoying a consumer or buyer surplus between the price paid and the value to the buyer. The seller similarly enjoys a producer or seller surplus between the minimum acceptable price and the sale price or the amount received.

In contrast to prior art processes, even though no offer has been submitted, the system of the present disclosure implements a technique whereby other users are electronically locked out or prevented from electronically submitting bids or offers during the period that the sets of ranges of prices, and the set of particular prices, are presented on the user interface and selections are input. Other users that submit an indication of interest detected by the system may be placed in a queue. The system makes determinations of time limits for buyers in selecting a price range and in selecting a particular price; if a determined time limit is exceeded, the system terminates the interaction, and commences a new interaction with a first interested buyer in the queue.

As noted, prospective buyers are provided a limited amount of time to make price range selections and particular price selections. Application of such time limits in a neutral and predictable manner in an electronic marketplace is important. However, buyers and sellers are likely to be communicating with a central server of a platform, over a variety of networks, including the Internet, wired networks, and/or wireless networks. As a result of variations in network latency, if the time period between a display of ranges on a user device and the expiration of a time period to select a range is determined at a central server, a signal from the user device indicating a selection may be delayed due to network latency, causing the server system to potentially incorrectly determine that the time limit had expired prior to the selection input. A solution to this technological problem may be provided by including software-implemented timers in the code of an application program executed by the user device, or as a script downloaded in a web page. The local application or web page may determine whether the selection is received prior to expiration of the timer implemented in application code or downloaded script, thereby avoiding network latency issues. The application software or code associated with a web page then communicates to the server a determination as to whether the selection was made within the time limit. The server may also implement a timer commencing at a time according to the server that a set of ranges or a set of particular prices was displayed, and provide a limit in time past the expiration of the server timer for receipt of a server time, such as 500 milliseconds or one second, to avoid allowing receipt of a selection where there has been manipulation of a timer, or an error in the code of a timer, on a user device. In embodiments, the server system and the application software or web pages may be configured to permit the server system to test the timer of the application software and web page, by sending an instruction to the application software to determine or calculate a time period and return a result on expiration of the determined time period. The time between the sending of the instruction and the receipt of the result at the server may be measured and compared to results expected based on typical network latency, which may be determined based on expected, estimated, temporal, and/or historical conditions and results, by way of non-limiting example. If the measured time exceeds the expected results, the server may terminate a transaction or interaction in progress. In an embodiment, when the system detects that the allocated time is exceeded, the buyer's process is terminated at the server, and the system commences interaction with the next buyer in the queue for presentation of sets of price ranges for selection. The determination that the time limit exceeds the expected results is indicative that the user's timing code, such as in a downloaded application on the user's device, or downloaded and executed in a user's web browser, has become corrupted or intentionally modified. For example, the timing code may have become corrupted, not by intentional action of the user, so as to still function and allow the user a greater time period to make a selection than permitted by the valid code of the application or webpage. Alternatively, a user may have intentionally modified or replaced the timing code to provide the user with a greater time period to make a selection than permitted by the valid code of the application or webpage. The timing process thereby provides a solution to a technological challenge, namely that of corrupted or intentionally modified code employed at the user device for the timing function. In embodiments, in response to detection of a measured time exceeding the expected results, a user may be flagged by the system as not eligible to participate in the process until the user downloads and installs an application, even if the user is already employing a local version, or refreshes a web page, thereby replacing the code that is suspected to be corrupted or modified.

FIG. 1 shows an example system architecture 100 that may be used in an embodiment of the invention. The example architecture 100 includes marketplace or e-commerce platform server 110. Marketplace platform server 110 carries out the necessary functions of an online electronic marketplace. Those functions include, by way of example, registering, maintaining data of and tracking marketplace participants, such as sellers and buyers; permitting sellers to offer goods and services for sale on the electronic marketplace, including providing formats for sellers to upload data regarding products, including product data, such as descriptions, images and/or video, applicable categories, and price data; making products and service data available for access and review by buyers, such as by providing search engine tools, and providing for presentation of products and services to buyers based on buyer information and product and service information.

For purposes of illustration, in the example architecture 100, memory 112 in communication with marketplace platform server 110. Memory 112 includes tangible, non-transitory storage media, which store, for purposes of illustration, reduced interval pricing module 114. Reduced interval pricing module 114 contains computer-executable instructions which cause the marketplace platform server 110 to perform steps of methods disclosed in this application.

The term "server" as used herein may designate a single server computer, multiple server computers, single or multiple server computers either dedicated to performing certain functionality, such as marketplace platform functionality, or such servers performing such functionality in addition to other functionality, as well as cloud-based computing capabilities provided by third parties.

The marketplace platform server 110 is further in communication with price range selection and transaction data storage 116. Data records of price ranges presented, price ranges selected, and transaction data may be stored in one or more databases in one or more data storage devices. The stored data is indicative of attitudes of potential purchasers as to appropriate pricing for a wide variety of products and services, and thus is valuable to a variety of parties. The stored data may be made available for review and analysis by a wide variety of parties, including operators of marketplaces, prospective buyers, prospective sellers, merchants and others. The system may be further configured to protect user privacy data, such as by removing individually identifiable data such as names, addresses, payment card data, and the like.

The marketplace platform server 110 is in communication with web server 120 and application server 122. Web server 120 and application server 122 perform similar functionality of providing communications between user devices on a network and marketplace platform server 110. Web server 120 specifically communicates with web clients on user devices running web clients. Web server 120 may include multiple modules, such as a web application module and a HyperText Transfer Protocol (HTTP) server module. The web application module may generate the web pages that make up a web site of the marketplace platform that includes pages displaying text and image files for implementing processes described in the present application, and which is communicated by an HTTP server module. The web application module may be implemented in and/or based on a technology such as Active Server Pages (ASP), PHP: Hypertext Preprocessor (PHP), Python/Zope, Ruby, any server-side scripting language, and/or any other appropriate technology. The HTTP server module may implement the HTTP protocol, and may communicate HyperText Markup Language (HTML) pages and related data from the web site to/from client devices using HTTP. The web site system 120 may also include one or more additional components or modules (not depicted), such as one or more switches, load balancers, firewall devices, routers, and devices that handle power backup and data redundancy.

Application server 122 provides communication between the marketplace platform server and devices running application programs intended for access to the marketplace platform. Application server 122, rather than providing web pages for rendering by web clients, may provide application programming interfaces (APIs) to provide communication with the marketplace platform server and associated databases. By way of example, an application server may be implemented using such products as J2EE, WebLogic, or Apache Tomcat. It will be appreciated that application server 122 includes programming to receive and respond to calls from user devices running application software for content.

The example architecture 100 of FIG. 1 also includes one or more wired and/or wireless networks 130 by which communications between the web server and the application server, and user devices, may take place. The networks may include the Internet, and may further include private or public networks, wired and wireless networks, and cloud or shared networks.

In certain embodiments, user devices 140, 142, and 144 can include, but are not limited to cellular telephones, other wireless communication devices, personal digital assistants, pagers, laptop computers, tablet computers, smartphones, other mobile display devices, or combinations thereof. User devices may serve roles of either buyer user devices or seller user devices as to a given product or service offered on the marketplace platform. The user devices may support application programs in communication with application server 122 or web clients in communication with web server 120.

Referring still to FIG. 1, one or more of the user devices 140, 142, and 144 may include a web browser module which may communicate data related to the web site to/from the web server 120. The web browser module may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module may implement Rich Internet Application (RIA) and/or multimedia technologies using one or more web browser plug-in modules and/or using one or more sub-modules within the web browser module itself. The web browser module may include a timer that is launched on display of a set of ranges or a set of particular prices, as discussed above. The user device may receive input from the user of the user device from input devices (not depicted) that are included in or connected to the user device, such a mouse or other pointing device, or a touch screen, and provide data that indicates the input to the web browser module.

Figure 2:
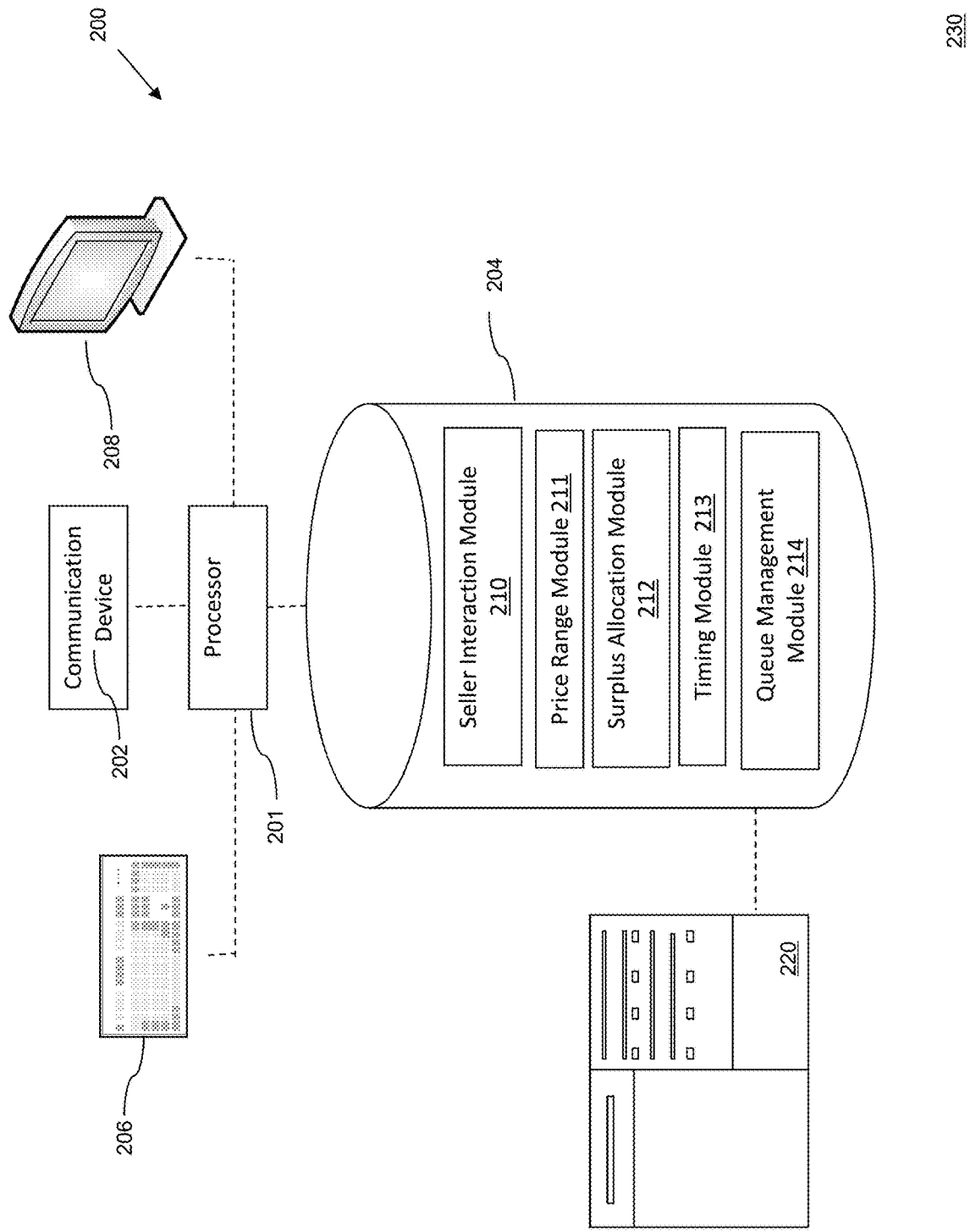
FIG. 2 shows an exemplary system that may be used for the administration of computerized processes in an embodiment.

Referring to FIG. 2, an exemplary computer system 200 for use in an implementation of the invention will now be described. Computer system 200 may be configured to perform functionality related to implementing the systems and methods disclosed herein in a marketplace and e-commerce platform environment.

Computer system 200 includes computer processor 201 operatively coupled to communication device 202, data storage device 204, one or more input devices 206 and one or more output devices 208. Communication device 202 may facilitate communication with external devices. Input device(s) 206 may comprise, for example, a keyboard, a keypad, a mouse or other pointing device, a microphone, knob or a switch, an infra-red (IR) port, a docking station, and/or a touch screen. Input device(s) 206 may be used, for example, to enter information into computer system 200. Output device(s) 208 may comprise, for example, a display (e.g., a display screen) a speaker, and/or a printer.

Data storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. Data storage device 204 stores program instructions for execution by processor 201.

In some embodiments, and as described with respect to FIG. 2, data storage device 204 may comprise a data warehouse or network or cloud type storage facility or mechanism that is in communication with a platform server 220, or may be integrated into a platform server. One or more public cloud, private cloud, hybrid cloud and cloud-like networks may also be implemented, for example, to store, handle and conduct processing of one or more transactions or processing of embodiments of the present invention. Cloud based computing may be used herein to handle any one or more of the application, storage and connectivity requirements of embodiments of the present invention. Furthermore, any suitable data and communication protocols may be employed to accomplish the teachings of embodiments of the present invention.

Data storage device 204 may store other data used and/or generated during operation according to some embodiments. For example, the data storage device 204 may store data including records of presented ranges, selected ranges, presented prices, selected prices, associated with products and services, and/or associated with buyers or buyer characteristic data.

System 200 may include communication device 202, which may be a communication hub for connection and data transfer via a network with remote computer systems and devices. A central processing unit or processor 201 executes instructions contained in the modules stored in storage device 204. Processor 201 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 204 may include suitable media, such as optical or magnetic disks, fixed disks with magnetic storage (hard drives), tapes accessed by tape drives, and other storage media. Processor 201 communicates, such as through a bus and/or other data channels, with such components (not shown) as communications interface unit, storage devices, system memory, and input/output controller. System memory may further include non-transitory computer-readable media such as a random access memory and a read only memory. Random access memory may store instructions in the form of computer code provided by the modules to implement embodiments of the present invention. One or more computer programs may be stored in memory, or computer usable media, such as storage devices 204 and random access memory, in the form of computer readable program code adapted to be executed by at least one processor, such as a processor central processing unit 201. The one or more computer programs may include instructions for performing steps of methods of embodiments of the invention described herein. System 200 may further include an input/output controller that may communicate with processor 201 to receive data from user inputs such as keyboard 206, pointing devices, touch screens, and audio inputs, and may provide data to outputs, such as data to video drivers for formatting on displays, such as monitor 208, and data to audio devices.

One or more public cloud, private cloud, hybrid cloud and cloud-like networks may also be implemented, for example, to handle and conduct processing of one or more transactions or processing of embodiments of the present invention. Cloud based computing may be used herein to handle any one or more of the application, storage and connectivity requirements of embodiments of the present invention. Furthermore, any suitable data and communication protocols may be employed to accomplish the teachings of embodiments of the present invention.

The program instructions may be stored and organized as modules of executable code for performing various functions associated with the present system. Suitable software modules include, by way of example, an executable program, a function, a method call, a procedure, a routine or sub-routine, one or more processor-executable instructions, an object, or a data structure. Seller interaction module 210 may include instructions for interactions with a user who desires to sell a product or service. The instructions may cause an interface of the seller user device to display instructions and input fields for identification of product or service characteristics, such as free text forms, drop down menus, radio buttons and other display elements for selection of types of product and services, and characteristics of the product or service, such as for a product such features as manufacturer, brand, model number, age, features, condition, and other characteristics, such as via interactive menus providing questions as to other characteristics. This module 210 also serves to request and receive a minimum acceptable price, which is stored within the system but, as noted, is not displayed to prospective buyers. The seller interaction module 210 may also provide options for the seller to direct a portion of the system determined difference between the offer price selected by the buyer and the minimum acceptable price to one or more entities other than the seller or buyer. For example, the module 210 may be configured to provide interfaces to permit the user to select a particular percentage of the difference in price to be directed to such other entity, or to select a fixed amount to be directed to the other entity. The module 210 may be configured to provide interfaces to permit the seller to select, via a suitable option such as a drop down menu, one of a list of available third party entities (e.g. select charities or organizations) to be selected as the recipient of the percentage in the difference.

Price range module 211 contains executable instructions for determining the price ranges to be presented to the prospective buyer. The instructions may contain a fixed number of price ranges for each set of price ranges. For example, the fixed number may be two, three, four, five, or more. Alternatively, the number of price ranges in each set may be variable. Factors in determining the number of ranges may be the minimum acceptable price, such that thresholds are set below which lower numbers of ranges are provided. The ranges are non-overlapping. In embodiments, the price ranges incorporate each possible value in the overall range, with no gap between adjacent price ranges. However, in other embodiments, gaps may be provided between adjacent price ranges.

The system is configured such that prospective purchasers are not able to determine the selected minimum price based on values in the sets of price ranges, such as minimum values of the lowest range or maximum values of the highest range, or from the breadth of the ranges. In embodiments, the determination of the sets of price ranges in accordance with instructions in price range module 211 may be based in part on one or more random variables, so that the values of the minimum price selected by the seller may not be derived from the values of the price ranges presented to the prospective buyer. In other embodiments, the system may employ a variety of formulas to introduce a random element into the determination of the number of sets of price ranges, so that the minimum price may not be derived from the number of sets of price ranges.

Algorithms for determining price ranges should provide that one of the price ranges in the first set of price ranges include the reserve price. Thus, the algorithm for determination of the price range should be based in part on the reserve price and in part on a random factor. In examples, algorithms may be implemented by the system to determine the extent of the price ranges of the first set of price ranges, the number of sets of price ranges and the lower limit of the lowest price range of the first set of price ranges.

By way of example, for a given reserve price P, in one embodiment, the system may provide for I, the extent of each price range of the initial set of price ranges, to be the reserve price multiplied by a random factor A having a value between 0.1 and 2.0, with the result rounded to the nearest whole dollar number. Other ranges of random factors may be employed, such as 0.1 to 1.0, or 0.05 to 0.5. In other embodiments, the system may calculate the extent R of the full set of ranges, from lowest value of the lowest range to highest value of the highest range. For this calculation of R, the random factor B would have a higher value, such as 0.5 to 10.0, or 0.5 to 5.0.

For a given reserve price P, in one embodiment, the range of the first set of price ranges may be set by fixing one point in the range, such as the highest value of the highest range, the lowest value of the lowest range, or another value, such as the average of the highest value of the highest range and the lowest value of the lowest range, or a highest or lowest value of another range in the set. By way of example, a random whole number between 0 and R may be subtracted from the reserve price P to set the lowest value of the first set of price ranges, thus providing for P to be anywhere from the lowest value of the lowest range to the highest value in the highest range.

If the reserve price is below a certain value, rather than using just whole dollar values, smaller values based on common units (e.g. ten cents, five cents, or one cent) may be employed.

A number of price ranges in a first set of price ranges may also be determined employing a random factor, such as by dividing the factor B by the factor A and rounding up to the next natural number.

It will be appreciated that a suitable set of fixed whole numbers may be employed to provide a limited number of fixed ranges of the initial set of price ranges that may be selected. This may be achieved by the system rounding a determined range upward to a next nearest number in a predetermined set of whole numbers. The use of a set of a relatively small number of fixed price ranges or intervals simplifies analysis of data collected as compared to the use of a larger number of fixed ranges, or the use of variable ranges of any breadth, and thus results in more efficient use of computer resources, such as data storage resources and processor resources, in analysis of data derived from the use of embodiments of the invention.

In an embodiment, in the case that R (the extent of the first set of price ranges) is larger than P (the reserve price), a random number between 0 and P may be selected instead of a number between 0 and R. This selected random number will be subtracted from P in order to determine the lowest value of the first price range in the first set of price ranges. This method of selection of the lowest value of the first price range is necessary to avoid the anomaly that would otherwise occur if a random number between P and R is selected and subtracted from P, resulting in a negative number as the lowest value in the first price range.

It will be appreciated that a suitable set of numbers to provide a limited number of fixed ranges of the initial set of price ranges may be selected. The use of a set of a relatively small number of fixed ranges simplifies analysis of data collected as compared to the use of a larger number of fixed ranges, or the use of variable ranges of any breadth, and thus results in more efficient use of computer resources, such as data storage resources and processor resources, in analysis of data derived from the use of embodiments of the invention.

Figure 4:
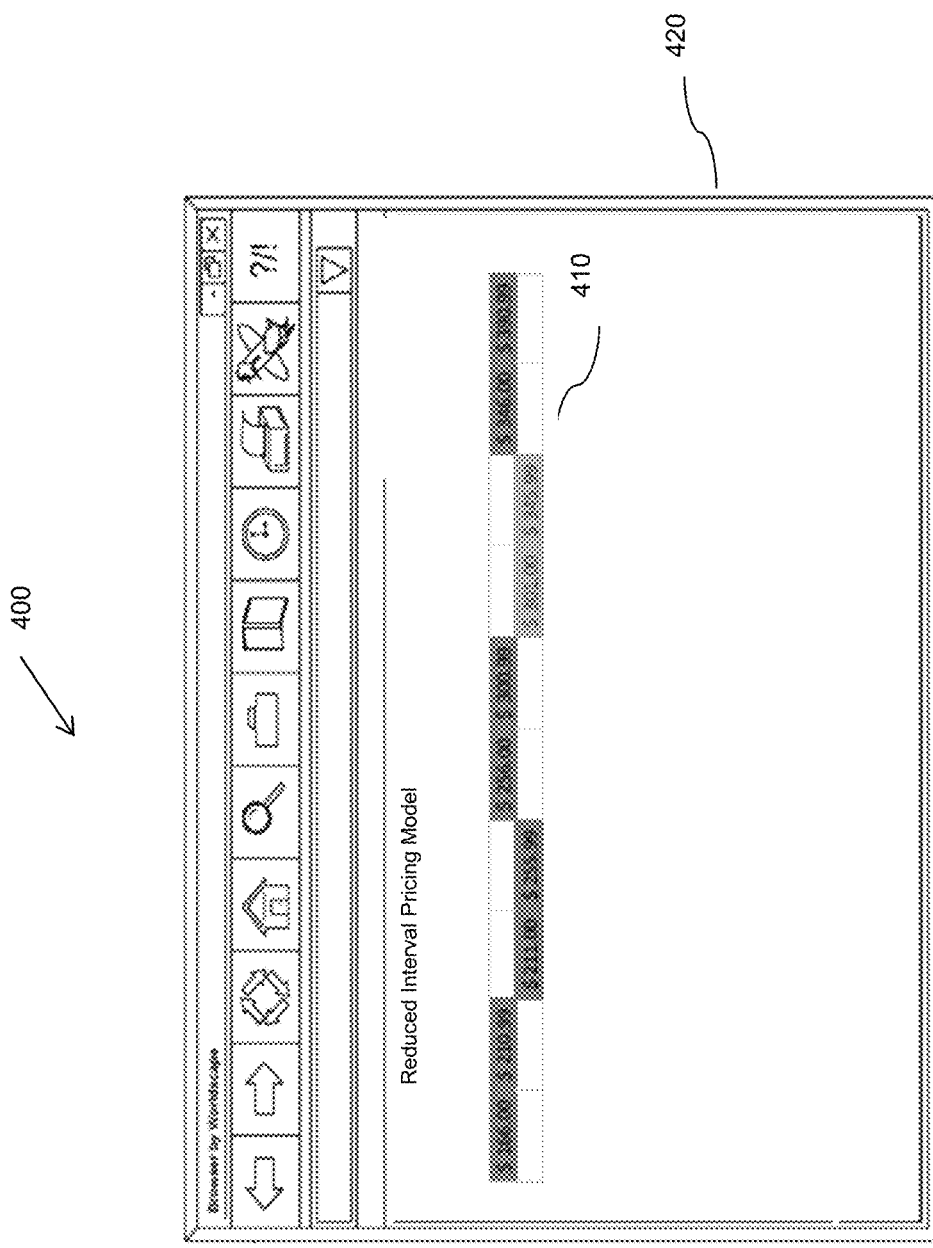
FIG. 4 shows an exemplary screen display in an embodiment of the present invention.

As an illustrative example, consider a seller, Seller 1, who wishes to sell Product 1. Seller 1 offers Product 1 for sale via embodiments, setting the reserve, or minimum price, P, at $269.79. The system rounds down to $269. The system selects the value of A, the random number, at 16%. The system calculates the value of I as the product A and P, with the result of $43.17. The result is rounded up to $44.00. The system then determines a nearest one to the value of LI of a set of predetermined whole numbers. In this example, the nearest whole number is $45.00. The size of each price range in the first set of price ranges will be $45.00. As the value of A is random, the potential purchaser cannot estimate the reserve price based on the size of the price ranges. The lowest value of the lowest price range of the first set of price range may also be determined in part randomly to prevent prospective purchasers from deriving the value of the reserve price. A lower limit may be selected by selecting a random number between $0.00 and $269.00, for instance $103.00, which will be subtracted from the reserve price of $269.00. In this example, a value of $166.00 will be determined from the application of random numbers. As $166.00 is determined based on use of random numbers, the prospective purchaser cannot determine the reserve price. FIG. 4 illustrates a first set of five price ranges with a lowest value of the first price range of $166.00 and a size of $45.00 for each of the five price ranges.

The instructions in price range module 211 may also include instructions for determining the number of sets of price ranges to be presented prior to presenting a set of prices, or if the number of price ranges per set may be a fixed or variable. In embodiments, for each number in the set of predetermined numbers, a number of sets of ranges may be stored, and employed by the system. The instructions in price range module 211 may also include instructions for determining the duration per set of price ranges or intervals for the prospective purchaser to make a selection. An exemplary set with values of price ranges or intervals, and relationships between this value of price ranges and the respective number of sets of ranges or intervals before individual prices are displayed, and exemplary time limits, are shown in Table 1 below:

TABLE 1

| A | B | C | D | E | F | G | H | I | J | K | L | M | N |
|---|---|---|---|---|---|---|---|---|---|---|---|---|---|
| L1: Value of a Price Interval in the initial Set of Price Intervals | | | | | | | | | | | | | |
| <$12.00 | <$75.00 | <$300.00 | <$1,500.00 | <$7,500.00 | <$45,000.00 | <$200,000.00 | <$1,000,000.00 | <$4,000,000 | <$20,000,000.00 | <$125,000,000.00 | <$500,000,000.00 | <$3,000,000,000.00 | >$3,000,000,000.00 |
| Number of Sets of Price Intervals Shown | | | | | | | | | | | | | |
| 3 | 4 | 5 | 6 | 7 | 8 | 9 | 10 | 11 | 12 | 13 | 14 | | |
| Timing per Set of Price Interval | | | | | | | | | | | | | |
| 10" | 20" | 30" | 40" | 50" | 1'00" | 1'10" | 1'20" | 1'30" | 1'40" | 1'50" | 2'00" | 2'30" | 3'00" |
| 10" | | | | | | | | | | | | | |
| 15" | | | | | | | | | | | | | |

By way of example, if the above calculation results in selecting $10.00 as the breadth or size of a price range in the initial set of price ranges, as in column A in Table 1, which covers values less than $12.00, the system will generate and display to the prospective purchaser for selection three sets of price ranges, each of the price ranges after the first being more narrow than the prior range, before a set of particular prices is generated and displayed for selection. The initial one of the three sets of price ranges will have price ranges of $10.00 each. The system will display the price ranges and individual prices on the user interface of the user device for a certain period of time; the user must input a selection by the conclusion of the period of time. In this embodiment, the period of time is dependent on the breadth or size of the price range, and thus is dependent indirectly on the value of the product or service offered, generally resulting in a longer time period for selection as the value of the product or service increases. In the example with $10.00 price ranges in the initial set of ranges presented for selection, the available times are 15 seconds, 10 seconds and 10 seconds, respectively, for each set of price ranges, and 10 seconds for selection of one of the particular prices. If the user does not provide a selection via the user interface on the user device within the set period of time for the applicable set of price ranges or set of prices, the interaction will conclude, and a suitable message may be displayed on the user interface of the user device. The web page or application on the user device may include programming that causes the user device to start a local timer upon display of a given set of price ranges or individual prices; upon receipt of a selection, the local programming checks whether the time period expired prior to input of the selection. If the time period did not expire, then the user device may transmit a message to the system to generate the next set of ranges or the particular prices, or other next step. By providing the timing function at the user device, any variations in timing that might occur if timing were tracked by the system, such as due to network latency between the system and the user device, are avoided, as well as reducing the demands on the processor and memory of the system.

In an example according to Table 1 where the initial ranges are each of $45.00, as shown in column B of Table 1, which applies to values from $12.00 and less than $75.00, the system will generate and display to the prospective purchaser for selection four sets of price ranges before a set of particular prices is generated and displayed for selection. The times available for selection are longer than in the case of the $10.00 price ranges, and here are at time intervals of 20 seconds, 15 seconds, 10 seconds and 10 seconds, respectively for each set of price ranges, with a time interval of 10 seconds for selection of one of the particular prices.

In an example according to Table 1 where the initial ranges are each $200.00, as in column C of Table 1, the system will generate and display to the prospective purchaser for selection five sets of price ranges before a set of particular prices is generated and displayed for selection. In this example, the periods of time (i.e. time intervals) during which the user may input the selection of a price range are at time intervals of 30 seconds, 20 seconds, 15 seconds, 10 seconds and 10 seconds, respectively, for each set of ranges, and a time interval of 10 seconds for selection of one of the particular prices In an example according to Table 1 where the initial ranges are each $2500.00, as in column E of Table 1, the system will also generate and display to the prospective purchaser for selection five sets of price ranges before a set of particular prices is generated and displayed for selection. In this example, the periods of time during which the user may input the selection of a price range are 50 seconds, 40 seconds, 30 seconds, 20 seconds and 15 seconds, respectively, for each set of price ranges, and a time interval of 10 seconds for selection of one of the particular prices.

As shown in Table 1, in embodiments, the numbers of sets of price ranges may increase in increments of 1 as various threshold values of predefined numbers are passed, up to 14 sets as shown in column N, for price ranges above $3,000,000,000.00. The timing per interval may also increase from fifteen seconds for the initial set of price ranges to three minutes for the initial set of price ranges.

The instructions in the price range module may further include instructions for determining the prices to be provided for selection. For example, the individual prices may be equally separated or randomly allocated prices within the selected price range of the last selected set of price range.

Surplus allocation module 212 may provide instructions for determination of a sale price to be paid to the seller and a purchase price to be paid by the buyer upon receipt of an offer price from the buyer user device of a price above the minimum price determined by the seller. The difference between the selected or offer price and the minimum or reserve price may be referred to as the surplus. In an example, if the surplus is small, such as less than $0.10, the instructions may cause the surplus to be divided between the buyer and seller, with no portion paid to the platform. Instructions may provide for a minimum amount, such as at least $0.01, provided to each of the buyer and seller, unless the surplus is less than $0.02. If the surplus is slightly larger, such as between $0.10 and $1.00, each of the seller and buyer may be guaranteed a minimum amount, such as $0.05, and the balance divided among the seller, the buyer and the platform in accordance with randomly selected percentages, or fixed percentages. If the surplus is greater than $1.00, the instructions may provide that each of the buyer, seller and platform receive a fixed percentage component, which may be the same or different, and which may increase as the value of the surplus increases, as well as a variable component to be based on a randomly selected number. The variable component may decrease as the value of the surplus increases.

In embodiments, the surplus allocation module may cause the system to present on a user interface of buyer and/or seller devices options for directing of all or a portion of the respective surplus. By way of example, following determination of the price to be paid by the buyer, the surplus allocation module may cause a display to be presented indicating the buyer's surplus, i.e., the difference between the bid or offer and the price to be paid by the buyer. The display may permit the buyer to select all or a portion of the buyer's surplus to be directed to a third party, and may present a list of third parties, such as charities, to which the buyer may direct all or a portion of the surplus. In an embodiment, the buyer may have the option of inputting a recipient selected by the buyer, and not from a list or menu. The recipient may be an individual or organization, or may be a particular account of an individual or organization, such as a savings account or other account. The system may also be configured by the surplus allocation module to present a display on the seller's user interface offering the seller options to direct a portion or all of the difference between the minimum price set by the seller and the price to be received by the seller, i.e., the seller's surplus, to a third party. The system may provide optional recipients, such as charities, and/or permit the seller to designate their own recipient, which may be an organization or individual, or an account of an individual or organization. In embodiments, if the seller has designated a recipient, such as a charity, for all or a portion of the seller's surplus, the system may be configured to display a selectable option on the buyer device to permit the buyer to donate all or a portion of the buyer's surplus to the same recipient. In embodiments, the system may be configured for all or a portion of the amount to be retained by the platform to be directed to a charity. In embodiments, the system may be configured to display a selectable option for the buyer or the seller to designate all or a portion of their respective surplus to be directed to a charity, and, in response to selection of such designation, donation by the platform of all or a portion of the platform's share to be directed to the charity.

Timing module 213 manages time limits for buyer responses to the sets of price ranges. The timing module may track, via suitable processes such as incorporating a timer in downloaded web pages and applications operating on user devices, the time that each page is displayed, and, responsive to determining that a given page has been displayed for a time period greater than a time limit, terminates the interaction with the user. Examples of time limits based on values of the size of the price intervals are given in Table 1. In some embodiments, the time limit per set of price ranges may be fixed, such as 15, 20 or 25 seconds. For example, the time limit may be greater responsive to higher values in the ranges.

The queue management module 214 may manage a queue of buyers who have expressed interest in the item for sale. The queue management module may add buyers responsive to a request, maintain an ordered list of buyers, and coordinate the initiation of an interaction with a first buyer in the queue if a current buyer exceeds a time limit or selects a range or price below the minimum price at the end of the process.

Figure 3A:
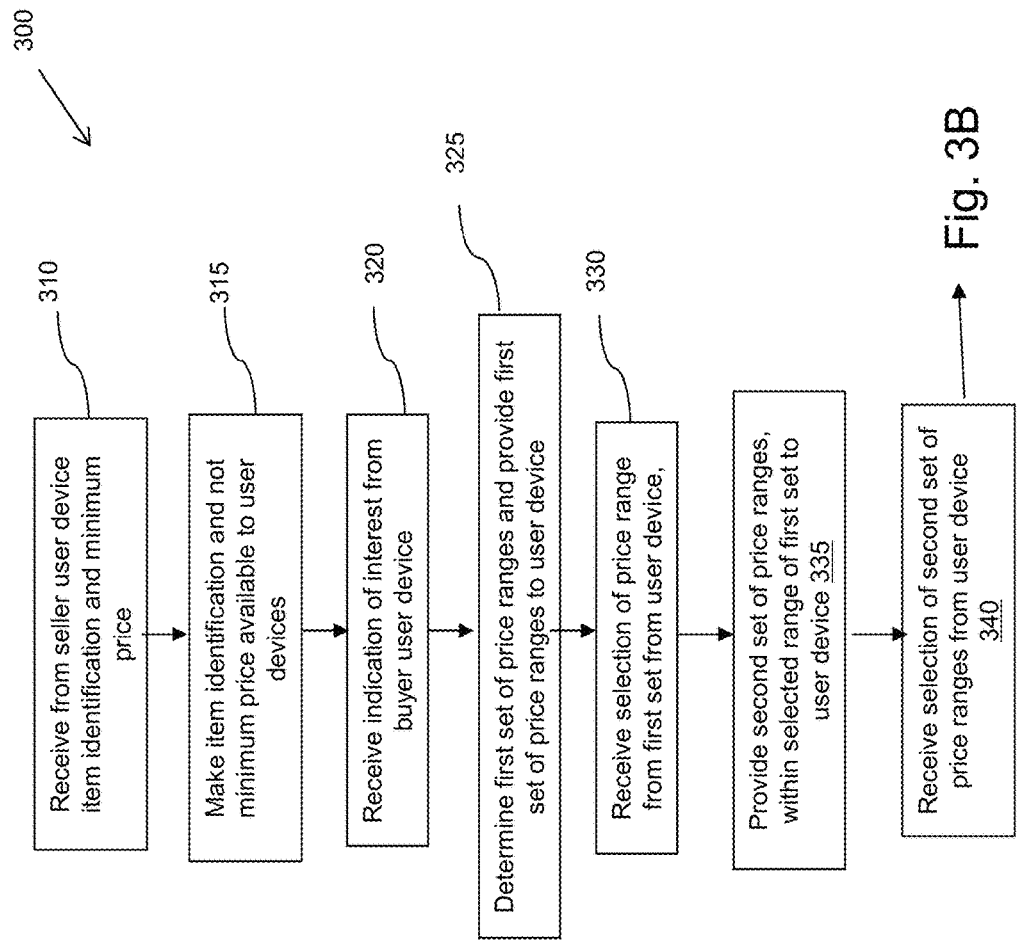

Referring to FIG. 3, an exemplary process flow diagram is shown. Process 300 commences with receipt 310, such as by platform server operating under control of a seller interaction module 210 of FIG. 2, of item information and minimum or reserve price. The item information and minimum price are stored. In embodiments, the system may be programmed for the reserve price to be fixed, or to permit the seller to change the reserve price only after a certain period of time, such as 60 minutes, 180 minutes, 6 hours, 12 hours or 24 hours, following publication of the item. The system may permit the seller to schedule the start of the sales process for a given time period after publication, such as immediately, in one hour, 3 hours, 6 hours, 12 hours, 24 hours, or 48 hours, or may permit the seller to start the process at a time determined in the future by the seller, for example. The system may permit the user to identify a third party entity, such as a charity, an educational or cultural institution or a private designee to receive all or a portion of the seller's surplus, and may permit the user to decide whether or not to publish the identification of the recipient, and the proportion of the surplus to be donated, to prospective purchasers.

The system publishes the availability of the item, including item information, but not the reserve price, timing of the start of the sale process, and any charitable designee, to make the item information available to potential purchasers 315. In response, an indication of interest is received from a buyer user device 320. By way of example, a web page displaying item information, such as a description, photo and features, may include a button that is programmed so that when selected by the user, such as by clicking using a mouse or other pointing device, to record an indication of interest. The platform may send a reminder (via e-mail, text/SMS message, message in a messaging application, application notification, pop up notification on a platform web page, or other suitable communication) at a particular time prior to the start of the sales process to each prospective purchaser who has indicated interest. In embodiments, the platform may be configured to send reminders to registered users of the platform whose demographic or interest information as stored in a platform database suitably matches the characteristics of the item being offered. The reminder may include an identification of the product or service to be sold, the time when a prospective purchaser may join a queue, and a time, after the time that the user may join the queue, that the sales process starts.

At a certain time period, such as 5 or 10 minutes prior to the start of the sales process, prospective buyers may select via their user interface to be placed in a queue. The position in the queue will be indicated to the prospective purchasers.

Thus, at the time of start of the sale process, an interaction with the buyer user device of the first buyer in the queue commences. As discussed above, the system determines the price ranges, in part randomly, based in part on the reserve price, and generates 325 a display of a first set of price ranges on the buyer device user interface. Such an exemplary display is shown in FIG. 4, where a set of five ranges is shown. The price ranges here are suitable for a consumer product. In response, the user selects one of the price ranges, which is received 330 by the system. As discussed above, certain time periods are allocated for the user to make a selection at each set of price ranges. As shown in FIG. 4, the range of $301.00 to $345.99 has been selected and is highlighted.

Figure 3B:
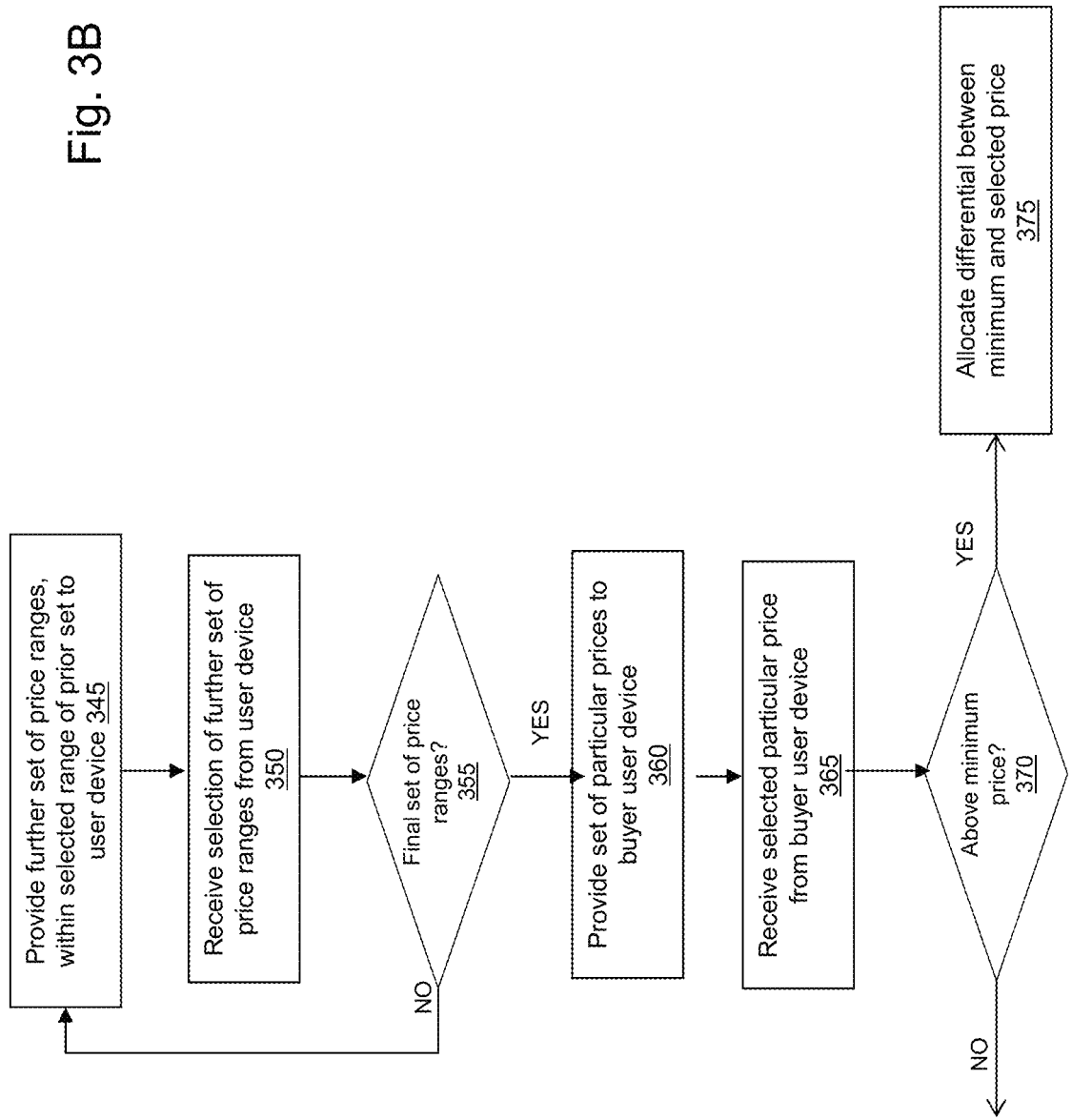

The server system receives 330 the selected one of the price ranges from the first set of price ranges. Responsive to receipt of the selected one of the price ranges from the first set, the system determines a second set of price ranges, the second set of price ranges being within the selected one of the first set of price ranges. The second set of price ranges may have the same or a different number of price ranges as the first set. The price ranges of the second set may be of equal or different size, and cover the entire range of the selected one of the price ranges of the first set. The system provides 335 the second set of ranges for display on the user device and selection by the user. The user then selects one of the ranges in the second set of ranges, and the selected one of the second set of ranges is received 340 by the system. The system determines a third set of ranges, within the selected one of the second set of ranges, and provides 345 the third set of ranges to the user device for display and user selection of one of the ranges in the third set of ranges. The user selects one of the ranges, and the selection of one of the ranges in the third set of ranges is received 350 by the system. As indicated in FIG. 3B, if the third set of ranges is the last set of ranges to be presented to the user 355, then the system proceeds to generate and cause to be displayed on the user interface a set of particular prices 360. If the current set of ranges is not the last set of ranges to be presented to the user, then the process flow returns to generating a next set of ranges, within the last-selected range of the prior set, as indicated at 335 and 345.

Figure 5:
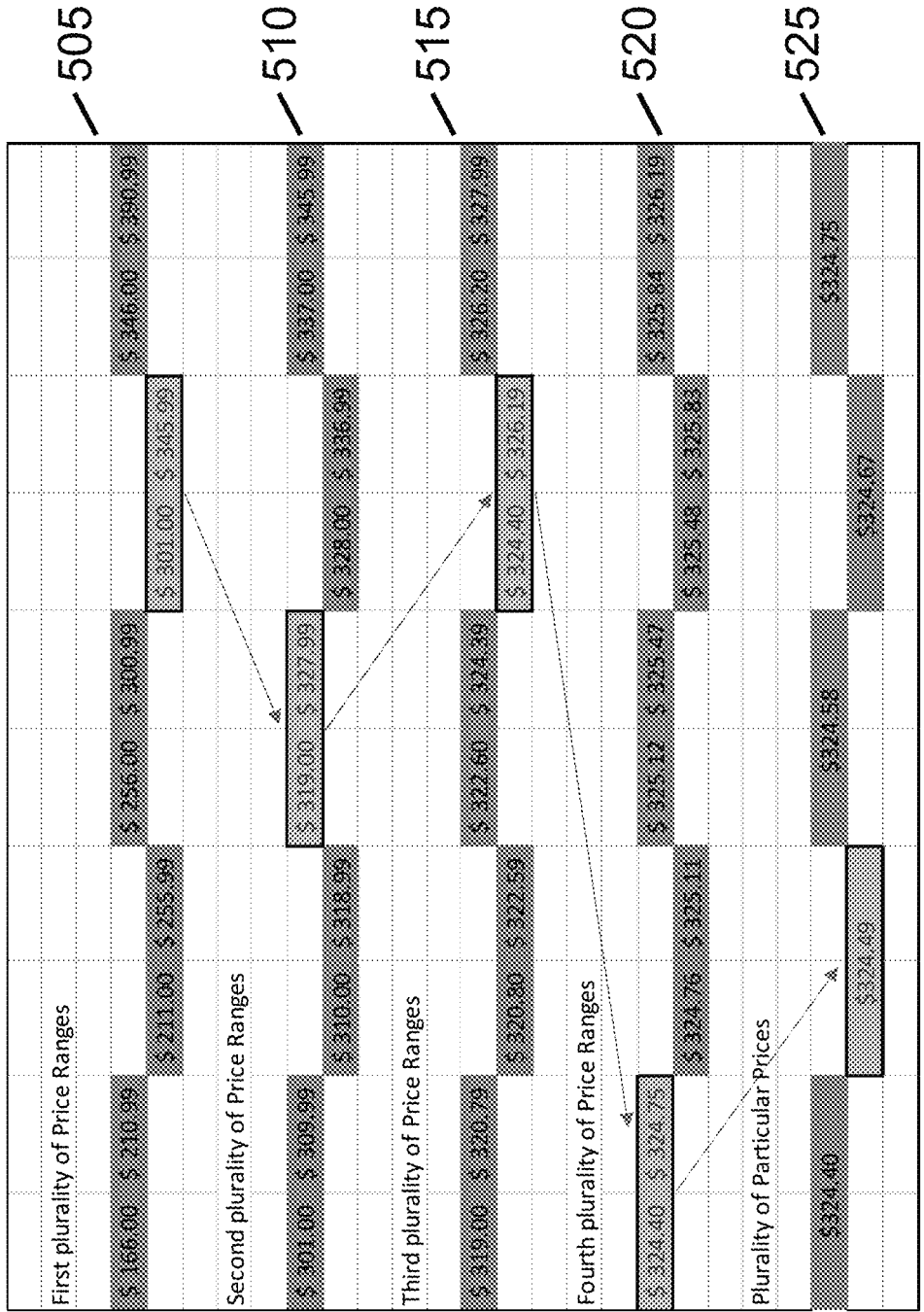
FIG. 5 is a schematic view of a progression of exemplary sets of price ranges presented on a user interface responsive to user interaction in an embodiment of the present invention.
Figure 6:
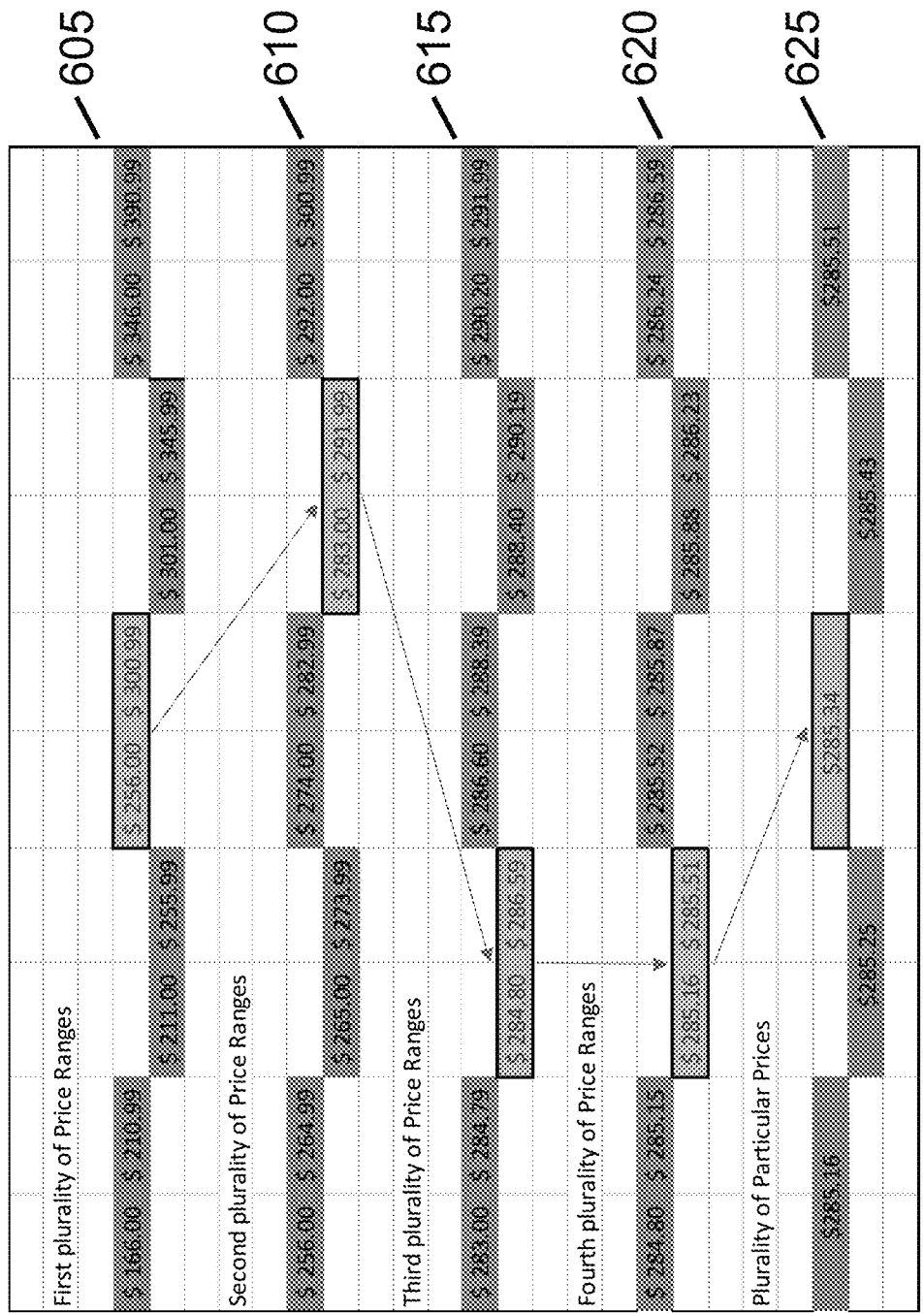
FIG. 6 is a schematic view of a progression of exemplary sets of price ranges presented on a user interface responsive to user interaction, similar to FIG. 5, in which the user selects different price ranges from those of FIG. 5, in an embodiment of the present invention.
Figure 7:
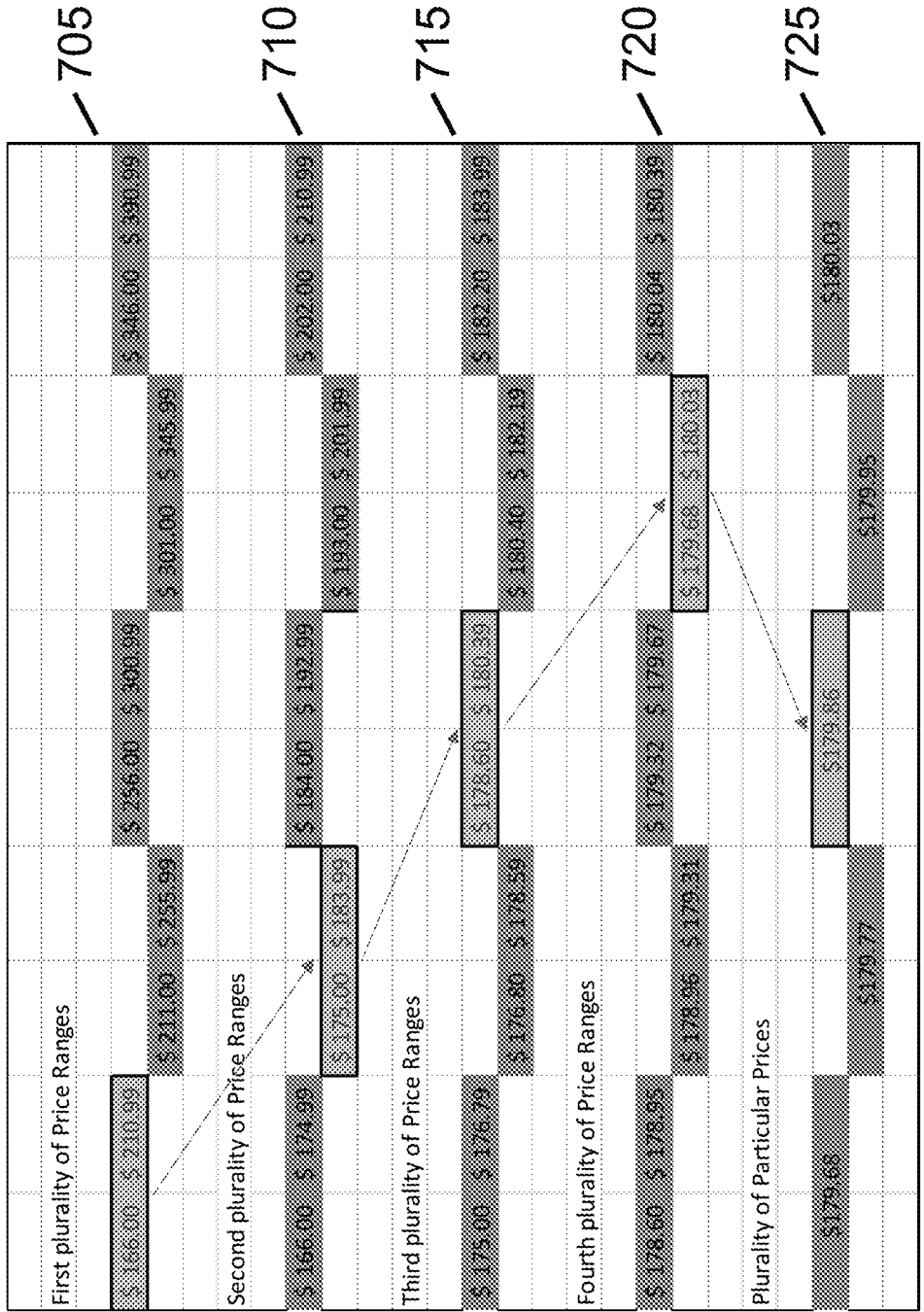
FIG. 7 is a schematic view of a progression of exemplary sets of price ranges presented on a user interface responsive to user interaction, similar to FIGS. 5 and 6, in which the user selects different price ranges from those of FIGS. 5 and 6, in an embodiment of the present invention.

As shown in FIGS. 5, 6 and 7, and discussed below, the system then provides successive price ranges within the prior selected price range. The process continues to generation and selection of individual prices.

If at any point the buyer fails to make a selection within the indicated time period, then the interaction is concluded, and the system commences an interaction with the next prospective buyer in the queue. The system may use visual and audio cues to alert the user that the expiration of the time period is approaching, such as by displaying the remaining time, using colors of the numbers of the remaining time or elsewhere on a user interface, such as initially in green then changing to yellow and then red as the time period approaches expiration. Audio effects, such as brief tones separated by periods of silence, with the tones changing with shortening periods of silence, increasing pitch, or in other ways that signal the approach of the expiration of the time period. The system may generate a web page notifying the user that the interaction has been terminated. Options may be offered, such as to rejoin a queue for the same item, to continue shopping, or, if no other buyer is interacting with the system with respect to that item, to resume the process immediately.

In each interaction, if the user responds within the deadline, the final set of choices is a choice of particular prices. The selected price is received 365 and is compared 370 to the minimum price. If the received price is above the minimum price, the system proceeds to allocate 375 the difference between the selected offer price and the minimum price, which is also called the surplus, among the buyer, seller and platform, as discussed above, and to notify the buyer and seller of the allocations. Any allocations to a charity or other recipient may also be calculated, and notified to the seller, or to both the buyer and seller if authorized by the seller. Thus, the seller will generally receive a price above the minimum price, and the buyer will pay a price below the selected offer price.

The system may communicate with one or more payment platforms to effect payment. By way of example, once the price has been determined, the system may send instructions to a third party card network to charge a payment card of the buyer that has been stored, and to provide payment to a seller account in the platform, a seller bank or other payment account (e.g., PayPal, Venmo, etc.), as well as to the platform itself, and to a charity or other recipient.

If the final price selected is not above the minimum, the system may take various next steps, as shown in FIG. 3C. If one of the selections made during the interaction by the user was of a range adjacent to a price range containing the reserve price 380, and the interaction otherwise qualifies, the prospective buyer is returned 390 to the set at which the adjacent range was selected, as explained in more detail below. Otherwise, the interaction is terminated 385. The system then returns the user to the end of the queue. In embodiments, the system may provide the user a selectable option to be returned to the queue, or to quit the process related to the item being offered.

At this stage, for smaller values, such as no more than three sets of price intervals indicated in Table 1, the system may display the sets of price ranges, with the selected price range shown in particular color if above the minimum price (e.g., green), and the price range or price selected that was below the minimum price shown in another color, e.g., red. The user may opt to return to the queue, and if the transaction is not concluded with a different buyer, go through the process again with the additional information provided by the display.

For greater values, where, for example, more than three sets of price ranges are involved, the price ranges may be again displayed as above, but where a price range selected was below the minimum price, but adjacent to an interval that includes or was above the minimum price, the selected price range is shown in a third color, such as orange. The system may then permit the user to immediately return to the interval where the choice shown in orange was made, so that the user may attempt to complete the remaining choices. This step is taken without returning the user to the queue.

The number of times the user may be permitted a further opportunity to make selections, based on one selection adjacent to the range containing the minimum price, may depend on the number of sets of price ranges, which in turn depends on the value. Thus, by way of example, for from 4 to 5 sets of price ranges, a single opportunity is provided. For 6 or 7 sets of price ranges, two opportunities may be provided. For 8 or 9 sets of price ranges, three opportunities may be provided. For 10 or 11 sets of price ranges, four opportunities may be provided. For 12 or 13 sets of ranges, five opportunities may be price provided. For 14 price intervals, 6 opportunities may be provided. The number of remaining opportunities may be displayed.

For buyers in the queue, their place in the queue may be displayed, and updated as buyers fail to select a successful price. When a buyer is in the queue, and a prior buyer reaches a successful transaction, the buyer in the queue is informed that the process has ended. The buyers in the queue may be informed as to the price paid by the successful buyer.

Referring to FIGS. 5, 6 and 7, various progressions of sets of ranges are illustrated, all starting from the first set of price ranges shown in rows 505, 605 and 705. In FIG. 5, the user has selected the fourth of the five price ranges in the first set 505. Thus, the system returns as the second set of price ranges at 510, a set of five price ranges within the range of the selected fourth range of the first set. In the second set 510, the user has selected the third range, and the system returns as the third set 515 a set of five price ranges within the range of the selected third range of the second set. In the third set 515, the user has selected the fourth range, and the system returns as the fourth set 520 a set of five price ranges within the selected fourth range from the third set. In the fourth set 520, the user has selected the first or lowest range, and the system returns five particular prices for selection at 525, all within the first range of the fourth set 520. The selected price is the second in the set 525, and is $324.49.

Referring now to FIG. 6, it will be seen that in comparison to FIG. 5, the selected price is considerably lower, as the user has selected a lower range in the first set 605 of five price ranges. Thus, the system returns as the second set of price ranges at 610, a set of five price ranges within the range of the selected middle or third range of the first set. Those five price ranges are all lower than the price ranges returned in FIG. 5 at 510. In the second set 610, the user has selected the fourth range, and the system returns as the third set 615 a set of five price ranges within the range of the selected fourth range of the second set. In the third set 615, the user has selected the second range, and the system returns as the fourth set 620 a set of five price ranges within the selected second range from the third set. In the fourth set 620, the user has selected the second range, and the system returns five particular prices for selection at 625, all within the second range of the fourth set 620. The available prices in the set 625 are well below the available prices in the set 525 of FIG. 5, as a result of earlier selections of lower ranges, and thus the selected price $285.34 is well below the price $324.49 selected in FIG. 5.

In FIG. 7, starting with the same initial set of ranges at 705, the user has selected the first or lowest range. As a result, the presented particular prices will necessarily be lower than those presented in the examples of either FIG. 5 or FIG. 6. The system returns as the second set of price ranges at 710, a set of five price ranges within the range of the selected first range of the first set, and thus lower than the price ranges in the sets 510 and 610 of FIGS. 5 and 6, respectively. In the second set 710, the user has selected the second range, and the system returns as the third set 715 a set of five price ranges within the range of the selected second range of the second set. These ranges are thus toward the lower end of the second set, which covered the lowest range of the first set. In the third set 715, the user has selected the third range, and the system returns as the fourth set 720 a set of five price ranges within the selected third range from the third set. In the fourth set 720, the user has selected the fourth range, and the system returns five particular prices for selection at 725, all within the fourth range of the fourth set 720. The selected price is the third in the set 725, and is $179.86, and thus well below the selected price $285.34 in FIG. 6 and $324.49 of FIG. 5.

It will be appreciated from the graphical presentation in FIG. 5, FIG. 6 and FIG. 7 with four sets of price ranges that the system provides 3,125 possible particular prices based on a particular width of ranges and starting price. As there are multiple random factors involved in determining the width of ranges and the starting prices, a very large number, indeed, in the hundreds of thousands, of possible particular prices are available for any given reserve price selected by the seller. Thus, as the system is employed for more and more transactions, the system will generate a large volume of data, which can be analyzed to identify purchaser price sensitivities in great detail. Indeed, each time a user goes through the process, additional data as to price preferences and sensitivity may be obtained for analysis. As a result, it will be possible for marketers of a wide variety of products covering a wide variety of price ranges to obtain high quality analytical data as to consumer price sensitivity. The wide variety and high quality of information available from the use of the system will provide for greater efficiency in the determination of pricing. One of the challenges of determining pricing for products and services is the large quantity of data that is available in the marketplace for analysis, which requires computationally complex systems to analyze as a result of the relatively large volume of data, where each data point may be of low value. For example, complex neural networks operating on hundreds or thousands of variables may be employed in the prior art. As a result of the high quality of the data obtained using the present system, the computations involved in determining optimum pricing will be simplified, resulting in computational and thus technological efficiencies.

Although the methods and features described above with reference to the figures are described above as performed using the example architecture 100 of FIG. 1 and the exemplary system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to the figures may be used alone without the other features and elements or in various combinations with or without other features and elements. Sub-elements of the methods and features described above with reference to the figures may be performed in any arbitrary order (including concurrently), in any combination or sub-combination.

What is claimed is:

1. A system for data processing for transactions to obtain guided real-time values for the offer and sale of goods and services, the system comprising:
   at least one processor;
   a memory coupled to the at least one processor;
   and one or more programs, wherein the one or more programs are stored in the memory and configured to be executed by the at least one processor, the one or more programs including instructions for:
   receiving from a user device, via a network, an identification of an item for sale and a minimum price for the item;
   responsive to the receiving, making the identification of the item and not the minimum price available for access by one or more buyer user devices;
   responsive to an indication of interest from one of the buyer user devices, presenting on an interface of the buyer user device a first plurality of price ranges for selection, wherein a lowest value and a breadth of the first plurality of price ranges for selection are based on at least one random variable, whereby the value of the minimum price selected by the seller is not derivable from the price range values and the lowest value of the first set of price ranges;
   responsive to receipt of a selection of one of the first plurality of price ranges, presenting on an interface of the buyer user device a second plurality of price ranges for selection, each of the second plurality of price ranges being within the selected one of the first plurality of price ranges;
   responsive to receipt of a selection of one of the second plurality of price ranges, presenting on an interface of the buyer user device a third plurality of price ranges for selection, each of the third plurality of price ranges being within the selected one of the second plurality of price ranges;
   responsive to receipt of a selection of one of a final plurality of price ranges, presenting on an interface of a buyer user device a plurality of particular offer prices for selection, all within a selected range of the final plurality of price ranges;
   responsive to receipt of one of the plurality of particular offer prices that is higher than the minimum price:
   allocating a difference between the received selected offer price and the minimum price among seller, buyer and platform; and
   providing to the seller device an indication of the price to be received, and to the buyer device an indication of the price to be paid;
   wherein each of the pluralities of price ranges comprises at least three price ranges.

2. The system of claim 1, wherein, responsive to receipt of an indication of interest from the buyer device, a lock out period is commenced, during which, responsive to receipt of an indication of interest from one or more further buyer devices, the further buyers are placed in a queue and assigned an order in the queue.

3. The system of claim 1, wherein, responsive to the user exceeding a time limit before selection of a price range, an interaction with the user is terminated, the time limit being dependent on a value of displayed price ranges.

4. The system of claim 1, wherein each of the pluralities of price ranges is of fixed or variable breadth.

5. The system of claim 1, wherein, responsive to selection of a price below the minimum price, the system is configured to determine whether one of the selected price ranges was adjacent a price range containing the minimum price, and, responsive to determining that one of the selected price ranges was adjacent a price range containing the minimum price, the buyer is presented an opportunity to update the price range selection.

6. The system of claim 1, wherein, the step of allocating a difference between the selected offer price and the minimum price among seller, buyer and platform comprises determining the difference between the selected offer price and the minimum price, comparing the determined difference to a threshold, and when the determined difference exceeds the threshold, allocating the difference between each of the buyer, seller and platform according to one or more of: (a) a fixed percentage component, or (b) a variable percentage component which varies according to the determined difference value; and when the determined difference does not exceed the threshold, allocating the difference between each of the buyer and seller only.

7. The system of claim 1, wherein on the condition that the final price selected is not greater than the minimum price, the processor executes instructions for displaying to the user a selectable option to return to the queue, whereby if the transaction is not concluded with a different buyer, the user is presented with further successive pluralities of price ranges for selection, followed by a plurality of further particular offer prices, and, responsive to receipt of one of the further plurality of particular prices that is higher than the minimum price, allocating a difference between the received selected further offer price and the minimum price among seller, buyer and platform; and providing to the seller device an indication of the price to be received, and to the buyer device an indication of the price to be paid.

8. The system of claim 1, wherein, the one or more programs include instructions for, responsive to allocation of a difference between the selected offer price and the minimum price, at least one of: (a) providing the seller an option to direct at least a portion of a difference between the minimum price and an amount to be paid to the seller, to a third party, and (b) providing the buyer an option to direct at least a portion of a difference between the selected offer price and a price to be paid by the buyer to a third party.

9. The system of claim 1, wherein the one or more programs include instructions for:

responsive to receipt of a selection of one of the third plurality of price ranges, presenting on an interface of the buyer user device a fourth plurality of price ranges for selection, each of the fourth plurality of price ranges being within the selected one of the third plurality of price ranges;

wherein each of the pluralities of price ranges comprises at least five price ranges;

storing data indicative of each selected one of the price ranges and each selected one of the particular offer prices for a plurality of users and a plurality of products, the stored data providing for simplified analysis to determine consumer price sensitivity.

10. The system of claim 1, wherein the one or more programs further include instructions for:

selecting from a set of fixed ranges the breadth of the price ranges of the first plurality of price ranges.

11. A computer-implemented method comprising:

receiving in a computer processor an electronic identifier of an item for sale and a minimum price for the item from a user device, via a network interface of a computer network;

responsive to the receiving step, making the identification of the item and not the minimum price accessible by one or more buyer user devices connected to the computer network;

responsive to an electronic indication of interest from one of the buyer user devices received in the computer processor, presenting on an interface of the buyer user device a first plurality of price ranges for selection, wherein a lowest value and a breadth of the first plurality of price ranges for selection are based on at least one random variable, whereby the value of the minimum price selected by the seller is not derivable from the price range values and the lowest value of the first set of price ranges;

responsive to receipt of selection of a given one of said first plurality of price ranges, presenting on an interface of the buyer user device a second plurality of price ranges for selection, each of the second plurality of price ranges being within the selected one of the first plurality of price ranges;

responsive to receipt of a selection of one of the second plurality of price ranges, presenting on an interface of the buyer user device a third plurality of price ranges for selection, each of the third plurality of price ranges being within the selected one of the second plurality of price ranges;

responsive to receipt of selection of a given one of a final plurality of price ranges, presenting on an interface of the buyer user device a plurality of particular offer prices for selection all within the selected one of the plurality of final price ranges;

responsive to receipt of one of the plurality of particular offer prices that is higher than the minimum price:

allocating a difference between the received selected offer price and the minimum price among seller, buyer and platform; and providing to the seller device via the network an indication of the price to be received, and to the buyer device an indication of the price to be paid.

12. The method of claim 11, further comprising, receiving in the computer processor an electronic indication of interest from the buyer device, and in response thereto, initiating a lock out period whereby, subsequent electronic indications of interest from one or more subsequent buyer devices cause said subsequent buyers to be placed in a queue and assigned an order in the queue.

13. The method of claim 11, wherein, responsive to the user exceeding a time limit before selection of a price range, an interaction with the user is terminated, the time limit being dependent on a value of displayed price ranges.

14. The method of claim 11, wherein each of the pluralities of price ranges is of fixed or variable breadth.

15. The method of claim 11, wherein, responsive to selection of a price below the minimum price, determining whether one of the selected price ranges was adjacent a price range containing the minimum price, and, responsive to determining that one of the selected price ranges was adjacent a price range containing the minimum price, presenting the buyer an opportunity to update the price range selection.

16. The method of claim 11, wherein, the step of allocating a difference between the selected price and the minimum price among seller, buyer, and platform:
- determining the difference between the selected offer price and the minimum price,
- comparing the determined difference to a threshold, and
- wherein when the determined difference exceeds the threshold,
  - allocating the difference between each of the buyer, seller and platform according to one or more of: (a) a fixed percentage component, and/or (b) a variable percentage component which varies according to the determined difference value; and
- wherein when the determined difference does not exceed the threshold,
  - allocating the determined difference between each of the buyer and seller only.

17. The method of claim 11, wherein on the condition that the final price selected is not greater than the minimum price, the processor executes instructions for displaying to the user a selectable option to return to the queue, whereby if the transaction is not concluded with a different buyer, the user is presented with further successive pluralities of price ranges for selection, followed by a plurality of further particular offer prices, and, responsive to receipt of one of the plurality of further plurality of particular prices that is higher than the minimum price, allocating a difference between the received selected further offer price and the minimum price among seller, buyer and platform; and providing to the seller device an indication of the price to be received, and to the buyer device an indication of the price to be paid.

18. The method of claim 11, wherein the method further comprises, responsive to allocation of a difference between the selected offer price and the minimum price, at least one of: (a) providing the seller an option to direct at least a portion of a difference between the minimum price and an amount to be paid to the seller to a third party and (b) providing the buyer an option to direct at least a portion of a difference between the selected offer price and a price to be paid by the buyer to a third party.

19. A non-transient computer readable medium storing instructions that when executed by a processor cause the processor to:
- responsive to receipt of an electronic identifier of an item for sale and a minimum price for the item from a user device, via a network interface, make the identification of the item accessible by one or more buyer user devices, and make inaccessible the minimum price by one or more buyer user devices connected to the computer network;
- generate a first plurality of price ranges associated with the item for sale for presentation and selection on an interface of the buyer user device, responsive to receipt of an electronic indication of interest from one of the buyer user devices, wherein a lowest value and a breadth of the first plurality of price ranges for selection are based on at least one random variable, whereby the value of the minimum price selected by the seller is not derivable from the price range values and the lowest value of the first set of price ranges;
- generate, in response to receipt of selection of a given one of said first plurality of price ranges, a second plurality of price ranges for selection, wherein each of the generated second plurality of price ranges is within the selected one of the first plurality of price ranges, and wherein said second plurality of price ranges are presented for selection on an interface of the buyer user device;
- responsive to receipt of a selection of one of the second plurality of price ranges, presenting on an interface of the buyer user device a third plurality of price ranges for selection, each of the third plurality of price ranges being within the selected one of the second plurality of price ranges;
- generate a plurality of individual offer prices within a final selected price range for presentation and selection on an interface of the buyer user device, responsive to receipt of selection of a given one of said final plurality of price ranges;
- responsive to receipt of one of the plurality of individual offer prices that is higher than the minimum price:
  - allocate a difference between the received selected offer price and the minimum price among seller, buyer and platform; and
  - provide to the seller device via the network an indication of the price to be received, and to the buyer device an indication of the price to be paid.

20. The computer readable medium of claim 19, further comprising instructions that when executed by the processor cause the processor to receive an electronic indication of interest from the buyer device, and in response thereto, initiate a lock out period whereby, subsequent electronic indications of interest from one or more subsequent buyer devices cause said subsequent buyers to be placed in a queue and assigned an order in the queue.

21. The computer readable medium of claim 19, wherein, responsive to the user exceeding a time limit before selection of a price range, an interaction with the user is terminated, the time limit being dependent on a value of displayed price ranges.

22. The computer readable medium of claim 19, wherein, responsive to selection of a price below the minimum, determining whether one of the selected price ranges was adjacent a price range containing the minimum price, and, responsive to determining that one of the selected price ranges was adjacent a price range containing the minimum price, presenting the buyer an opportunity to update the price range selection.

* * * * *